United States Patent
Ying et al.

(10) Patent No.: US 7,184,287 B2
(45) Date of Patent: Feb. 27, 2007

(54) RECTIFIER CLAMPING CIRCUIT WITH REVERSE ENERGY RECOVERY

(75) Inventors: Jianping Ying, Taoyuan Shien (TW);
Teng Liu, Taoyuan Shien (TW);
Xingkuan Guo, Taoyuan Shien (TW);
Jianhong Zeng, Taoyuan Shien (TW);
Yue Fu, Taoyuan Shien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 83 days.

(21) Appl. No.: 10/902,356

(22) Filed: Jul. 29, 2004

(65) Prior Publication Data

US 2005/0024803 A1    Feb. 3, 2005

(30) Foreign Application Priority Data

Jul. 30, 2003    (TW) .............................. 92120921 A

(51) Int. Cl.
*H02M 7/5387*  (2006.01)
*H02H 7/125*  (2006.01)
(52) U.S. Cl. ........................................ 363/126; 363/52
(58) Field of Classification Search ................ 363/126, 363/89, 52
See application file for complete search history.

(56) References Cited

U.S. PATENT DOCUMENTS

| 4,471,423 | A | * | 9/1984 | Hase | 363/90 |
| 4,903,186 | A | * | 2/1990 | Pullen, Jr. | 363/45 |
| 4,949,234 | A | * | 8/1990 | Gulczynski | 363/48 |
| 5,172,308 | A | * | 12/1992 | Tohya | 363/16 |
| 5,637,988 | A | * | 6/1997 | Gucyski | 323/222 |
| 5,986,900 | A | * | 11/1999 | Clark | 363/44 |

* cited by examiner

*Primary Examiner*—Shawn Riley
(74) *Attorney, Agent, or Firm*—Volpe and Koenig, P.C.

(57) ABSTRACT

An energy-feedback clamping circuit of a power converter is proposed. The converter includes a transformer coupled to a full-wave rectifier circuit. The clamping circuit includes: two clamping diodes having two anodes coupled to each other at a common-anode terminal and two cathodes coupled to two terminals of a secondary winding of the transformer, a first clamping capacitor having a first terminal coupled to a cathode of a first rectifying diode of the rectifier circuit and a second terminal coupled to the common-anode terminal, a second clamping capacitor having a first terminal coupled to a connecting node of the output filtering inductor and capacitor of the rectifier circuit and a second terminal coupled to the common-anode terminal, and a converter circuit having an input terminal coupled to the second clamping capacitor and an output terminal for offering a power source.

16 Claims, 16 Drawing Sheets

US 7,184,287 B2

RECTIFIER CLAMPING CIRCUIT WITH REVERSE ENERGY RECOVERY

FIELD OF THE INVENTION

The present invention relates to the improvements of the clamping circuit of the power circuit. More specifically, this invention relates to an energy-feedback clamping circuit for clamping a reverse voltage over the two terminals of the power elements of the power converter so as to achieve a relatively higher efficiency of the power converter.

BACKGROUND OF THE INVENTION

Please refer to FIG. 1, it is the schematic diagram which shows the current and voltage waveforms related to the reverse recovery of a diode in the prior art. At the moment when a diode is turned off, this diode does not have the reverse blocking capability due to the stored charges, thus a reverse current $I_f$ is generated. When the diode has the reverse blocking capability at the moment $t_1$, the absolute value of the current will drop dramatically so as to generate relatively high voltage spikes due to the inductance in the loop of the diode. In FIG. 1, $I_{D1}$ is the conductive current of the diode, and $V_{D1}$ is the voltage across the anode and cathode of the diode.

Please refer to FIG. 2, it shows the schematic circuit diagram of a typical full-wave rectifier circuit in the prior art. Assume that the waveform of the input voltage for rectifying is a square wave having the positive and negative wave-amplitudes. The operational procedures of the rectifying can be divided into: the rectifying stage, the continuation stage, and the recovery stage, and described as follows.

1. Rectifying stage: Please refer to FIG. 3. In which, the voltage $V_1$ is positive, the diode $D_1$ is conductive, the current flowing through the diode $D_1$ is $I_{L1}$, the diode $D_2$ is turned off, and inductors $L_{s1}$ and $L_{s2}$ represent the leakage inductance of the transformer respectively.

2. Continuation stage: Please refer to FIG. 4. In which, the voltage $V_1$ is zero, the diodes $D_1$ and $D_2$ are conductive, and the sum of the currents flowed through the diodes $D_1$ and $D_2$ is $I_{L1}$ 3. Recovery stage: Please refer to FIG. 5. In which, the voltage $V_1$ drops from zero to negative value, the diode $D_1$ enters the reverse recovery stage having a current of $I_f$, and $D_2$ is conductive having a current equals to the sum of the currents $I_{L1}$ and $I_f$. When the diode $D_1$ has been recovered till the moment t1, the diode $D_1$ becomes to have the reverse blocking capability because of its' relatively high impedance value, and the ripple currents of the inductors $L_{s1}$ and $L_{s2}$ will generate the relatively high voltage spikes across the anode and the cathode of the diode $D_1$. Due to the symmetric feature of the circuit, the diode D2 will have the reverse recovery problem too.

If the voltage spikes are not snubbed, the high-voltage diodes must be employed since the values of these voltage spikes could be several times of the rated reverse voltage of the diode. But, the forward voltage drops of the high-voltage diodes are higher than those of the low-voltage diodes in general. Thus, the power losses of the circuit would be increased dramatically due to the employment of the high-voltage diodes.

Please refer to FIG. 6, it is the schematic circuit diagram of the first clamping circuit for resolving the reverse recovery problem of the diode in the prior art. The operational principles of this circuit are: 1. When the diodes $D_{s1}$ and $D_{s2}$ enter the reverse recovery stage at the above-mentioned moment t1 and appear to have the relatively high impedances, the electrical energies of the leakage inductances are stored in the capacitor $C_{s1}$ or $C_{s2}$ through the diode $D_{s1}$ or $D_{s2}$ respectively; 2. The electrical energies stored in the capacitors $C_{s1}$ and $C_{s2}$ are sent to the load through the switches $S_A$ and $S_B$. The advantages of this clamping circuit are: having a relatively good clamping effect and having no loss. The disadvantage of this clamping circuit is: the controlling of the circuit is relatively complex.

Please refer to FIG. 7, it is the schematic circuit diagram of the second clamping circuit for resolving the reverse recovery problem of the diode in the prior art. The operational principles of this circuit are: 1. When the diodes $D_{s1}$ and $D_{s2}$ enter the reverse recovery stage at the above-mentioned moment t1 and appear to have the relatively high impedances, the electrical energies of the leakage inductance are stored in the capacitor $C_{s1}$ or $C_{s2}$ through the diode $D_{s1}$ or $D_{s2}$; 2. The electrical energies stored in the capacitors $C_{s1}$ and $C_{s2}$ are sent to the primary side $N_p$ of the high-voltage transformer $T_2$ through the switches $S_x$. The advantages of this clamping circuit are: having a relatively good clamping effect and having no loss. The disadvantages of this clamping circuit are: having the safety regulation problem regarding the high-voltage transformer $T_2$ and having relatively lower efficiency.

Please refer to FIG. 8, it is the schematic circuit diagram of the third clamping circuit for resolving the reverse recovery problem of the diode in the prior art. The operational principles of this circuit are: When the diodes $V_{D1}$ and $V_{D2}$ enter the reverse recovery stage at the above-mentioned moment t1 and appear to have the relatively high impedances, the electrical energies of the leakage inductances are transferred to the primary side of the transformer through a forward converter. The advantage of this clamping circuit is: the controlling of the circuit is relatively simple. The disadvantages of this clamping circuit are: having a relatively worse clamping effect, having the safety regulation problem regarding the high-voltage transformer, and having relatively lower efficiency.

Keeping the drawbacks of the prior arts in mind, and employing experiments and research full-heartily and persistently, the lossless clamping circuit of the power converter having a relatively higher efficiency is finally conceived by the applicants.

SUMMARY OF THE INVENTION

It is therefore an object of the present invention to propose the lossless clamping circuits for clamping a reverse voltage over the two terminals of the power elements of the power converter so as to achieve a relatively higher efficiency of the power converter.

According to the first aspect of the present invention, the lossless clamping circuit for clamping a reverse voltage over two terminals of a power element of a power converter, in which the power converter includes a transformer having a secondary winding electrically connected to a full-wave rectifier circuit, and the full-wave rectifier circuit includes a first rectifying diode, a second rectifying diode, an output filtering inductor, and an output filtering capacitor, includes: two clamping diodes having two anodes electrically connected to each other to form a common-anode terminal and two cathodes electrically connected to two terminals of the secondary winding of the transformer, a first clamping capacitor having a first terminal electrically connected to a cathode of the first rectifying diode and a second terminal electrically connected to the common-anode terminal, a second clamping capacitor having a first terminal electrically connected to a connecting node of the output filtering inductor and the output filtering capacitor, and a second terminal electrically connected to the common-anode terminal, and a converter circuit having an input terminal electrically connected to the second clamping capacitor and an output terminal for offering a power source.

Preferably, the power source is employed to feedback an electrical energy to one of a primary winding and the secondary winding of the transformer.

Preferably, the power source is employed as an auxiliary power source.

Preferably, the converter circuit is a boost circuit.

Preferably, the boost circuit includes: an inductor having a first terminal electrically connected to the connecting node, a switch having a first terminal electrically connected to a second terminal of the inductor and a second terminal electrically connected to the common-anode terminal, and a diode having an anode electrically connected to the second terminal of the inductor and a cathode electrically connected to a cathode of the first rectifying diode.

Preferably, the inductor is an energy feedback inductor, the diode is an energy feedback diode, and the switch is an energy feedback switch.

According to the second aspect of the present invention, the lossless clamping circuit for clamping a reverse voltage over two terminals of a power element of a power converter, in which the power converter includes a transformer having a secondary winding electrically connected to a full-wave rectifier circuit, and the full-wave rectifier circuit includes a first rectifying diode, a second rectifying diode, an output filtering inductor, and an output filtering capacitor, includes: two clamping diodes having two anodes electrically connected to each other to form a common-anode terminal and two cathodes electrically connected to two terminals of the secondary winding of the transformer, a clamping capacitor having a first terminal electrically connected to a cathode of the first rectifying diode and a second terminal electrically connected to the common-anode terminal, and a converter circuit having an input terminal electrically connected to the clamping capacitor and an output terminal for offering a power source.

Preferably, the power source is employed to feedback an electrical energy to one of a primary winding and the secondary winding of the transformer.

Preferably, the power source is employed as an auxiliary power source.

According to the third aspect of the present invention, the lossless clamping circuit for clamping a reverse voltage over a full-bridge rectifier circuit of a power converter, in which the power converter includes a transformer having a secondary winding electrically connected to the full-bridge rectifier circuit, includes: a clamping capacitor electrically connected to an output terminal of the full-bridge rectifier circuit, and a converter circuit having an input terminal electrically connected to the clamping capacitor and an output terminal for offering a power source.

Preferably, the power source is employed to feedback an electrical energy to one of a primary winding and the secondary winding of the transformer.

Preferably, the power source is employed as an auxiliary power source.

According to the fourth aspect of the present invention, the lossless clamping circuit for clamping a reverse voltage over two terminals of a power element of a double current circuit of a power converter, in which the power converter includes a transformer having a secondary winding electrically connected to a full-wave rectifier circuit, and the double current circuit includes a first double current diode and a second double current diode, includes: two clamping diodes having two anodes electrically connected to each other to form a common-anode terminal and two cathodes electrically connected to two terminals of the secondary winding of the transformer, a clamping capacitor having a first terminal electrically connected to a connecting node of the first double current diode and the second double current diode, and a second terminal electrically connected to the common-anode terminal, and a converter circuit having an input terminal electrically connected to the clamping capacitor and an output terminal for offering a power source.

Preferably, the power source is employed to feedback an electrical energy to one of a primary winding and the secondary winding of the transformer.

Preferably, the power source is employed as an auxiliary power source.

According to the fifth aspect of the present invention, a lossless clamping circuit for clamping a reverse voltage over two terminals of a power element of a double current circuit of a power converter, in which the power converter includes a transformer having a secondary winding electrically connected to a full-wave rectifier circuit, and the double current circuit includes a first double current diode and a second double current diode, includes: two clamping diodes having two cathodes electrically connected to each other to form a common-cathode terminal and two anodes electrically connected to two terminals of the secondary winding of the transformer, a clamping capacitor having a first terminal electrically connected to a connecting node of the first double current diode and the second double current diode, and a second terminal electrically connected to the common-cathode terminal, and a converter circuit having an input terminal electrically connected to the clamping capacitor and an output terminal for offering a power source.

The present invention may best be understood through the following descriptions with reference to the accompanying drawings, in which:

DETAILED DESCRIPTION OF THE PREFERRED EMBODIMENT

Figure 9:
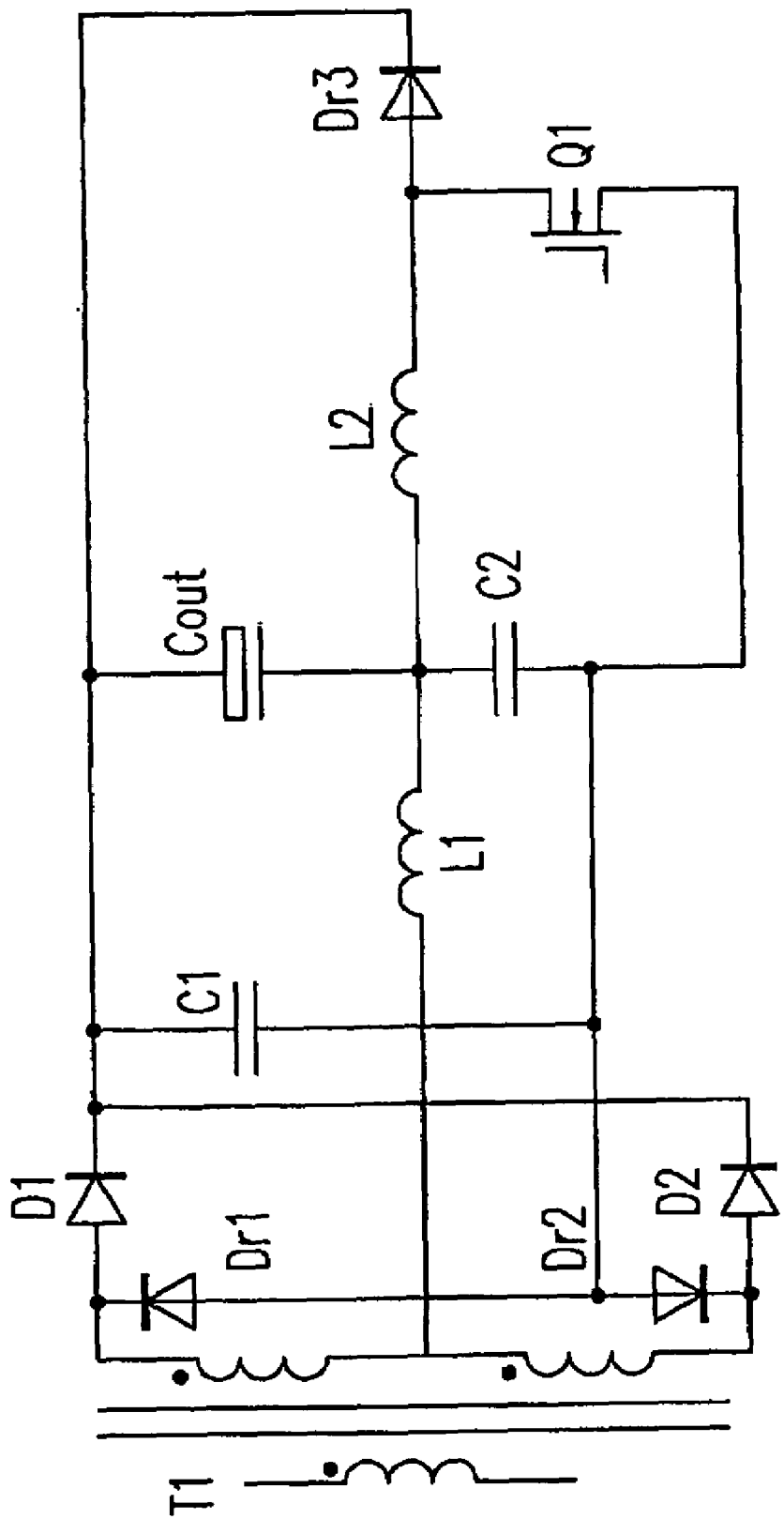
FIG. 9 is the schematic circuit diagram of the first preferred embodiment of the present invention having a boost converter to clamp the reverse voltage of the diode.

To overcome the drawbacks in the above-mentioned prior arts, a boost converter (a circuit includes $L_2, D_{r3}, Q_1, C_2$, and $C_{out}$ as shown in FIG. 9) is employed to clamp the reverse voltage of the diode. The operational principles of the present invention are analyzed as follows.

Figure 1:
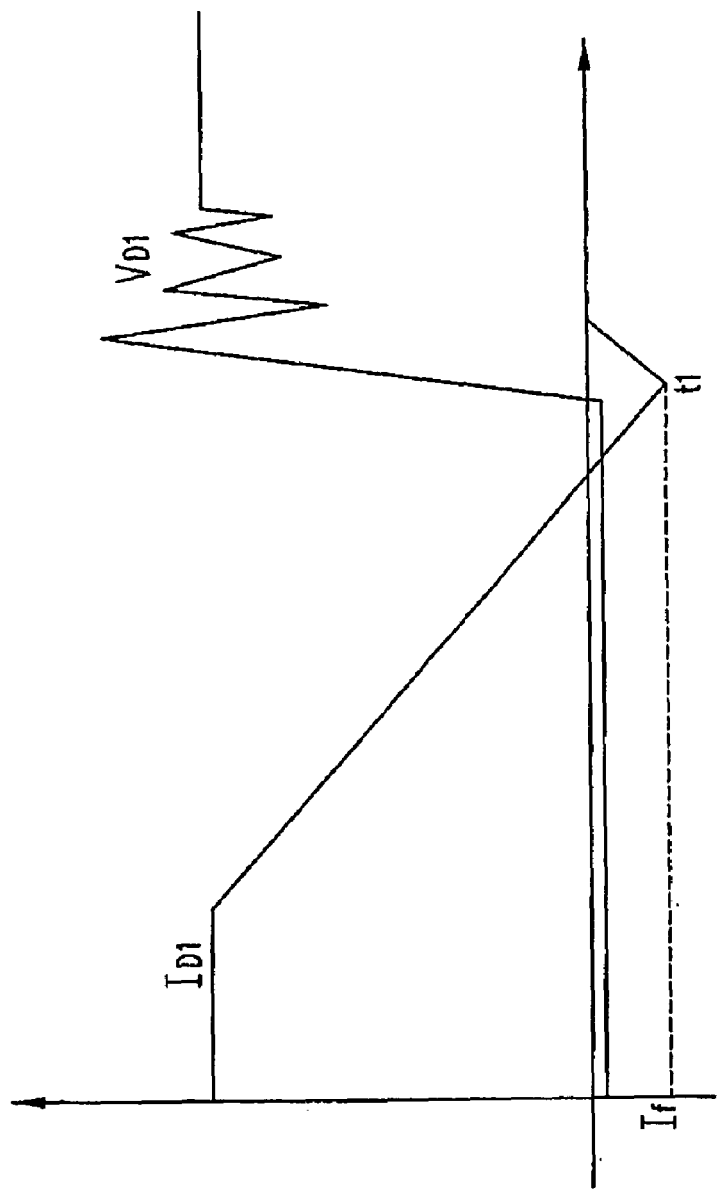
FIG. 1 is the schematic diagram which shows the current and voltage waveforms related to the reverse recovery of a diode in the prior art.
Figure 2:
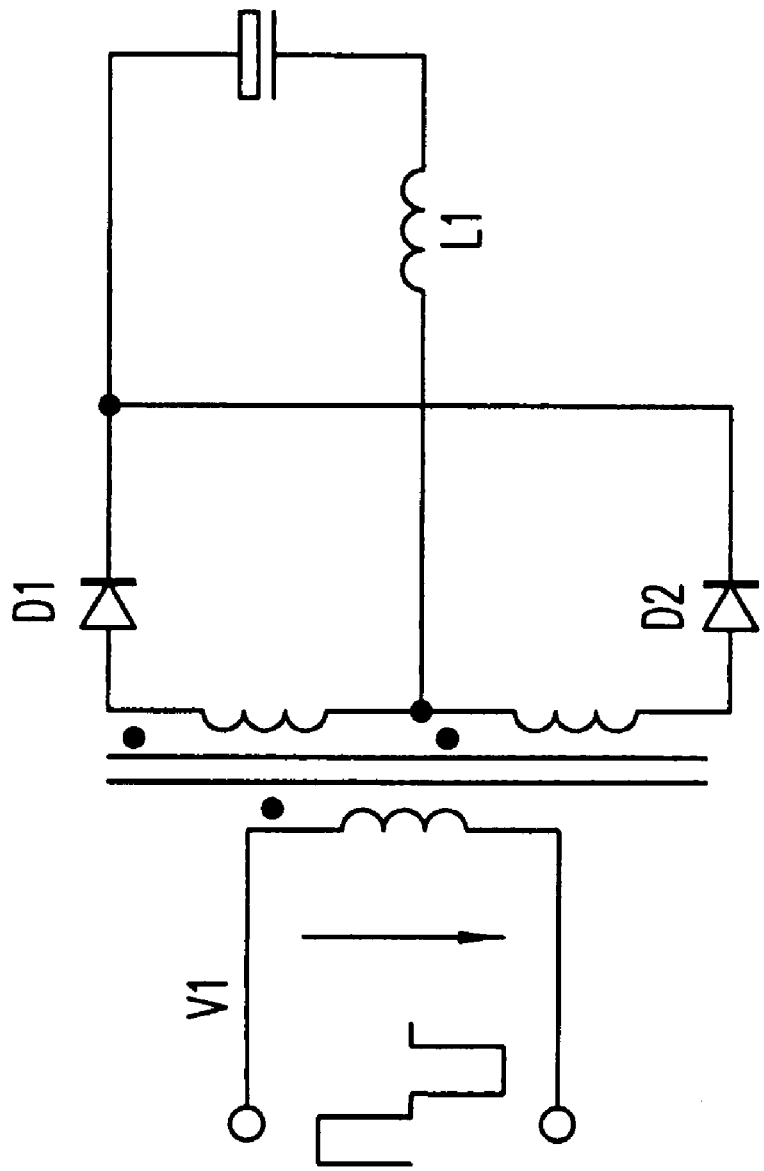
FIG. 2 is the schematic circuit diagram of a typical full-wave rectifier circuit in the prior art.
Figure 3:
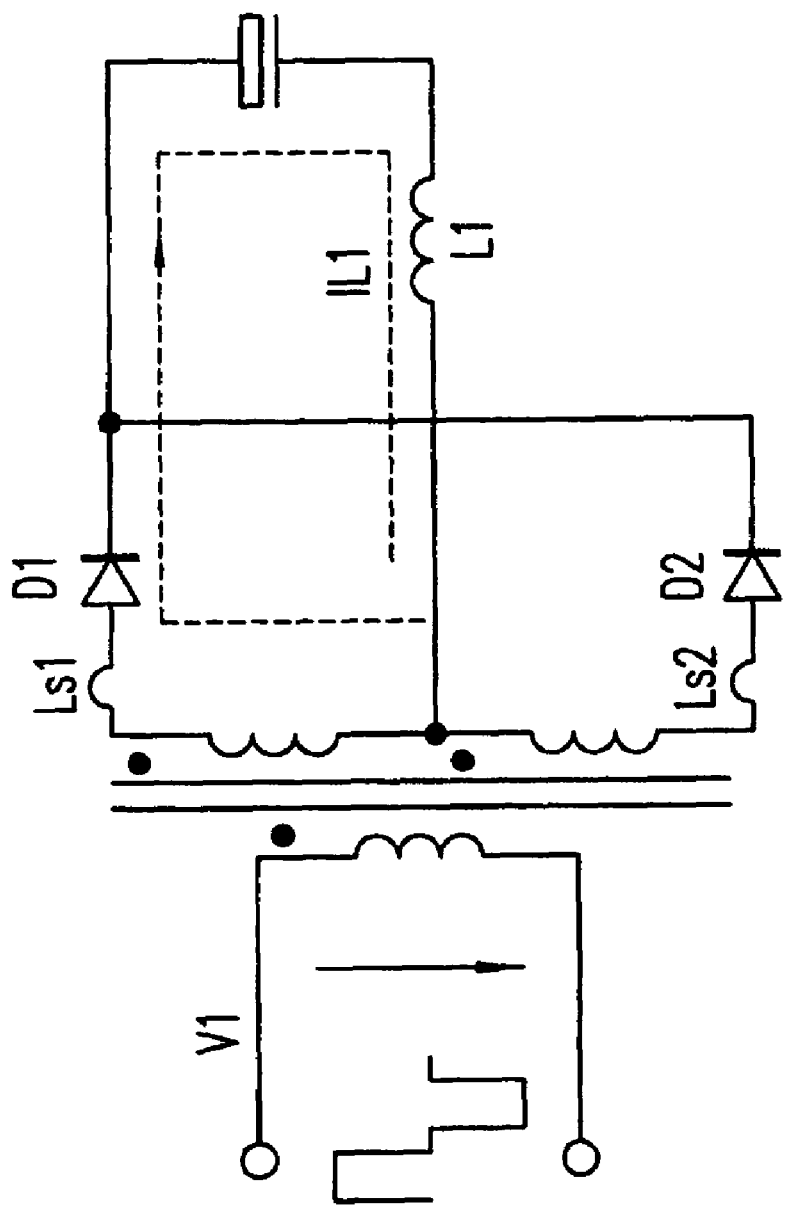
FIG. 3 is the schematic circuit diagram which shows the relative currents of the rectifying stage of a typical full-wave rectifier circuit in the prior art.
Figure 4:
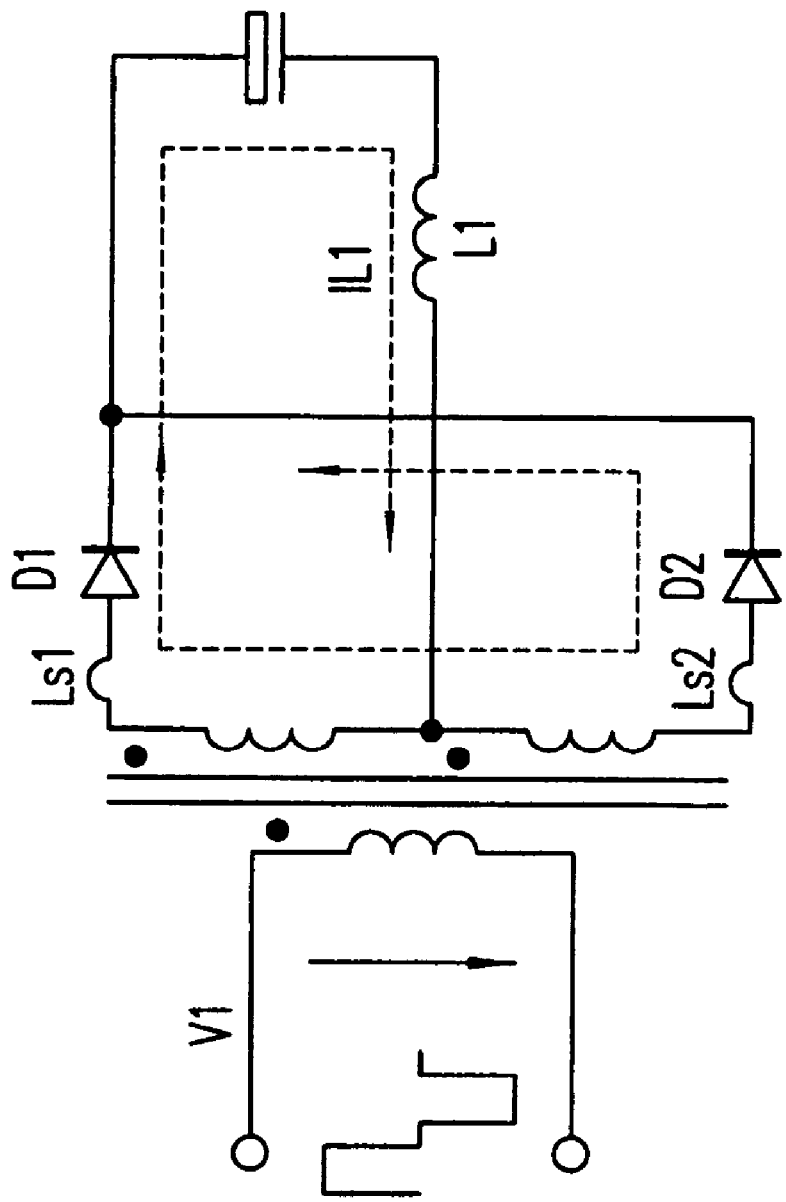
FIG. 4 is the schematic circuit diagram which shows the relative currents of the continuation stage of a typical full-wave rectifier circuit in the prior art.
Figure 5:
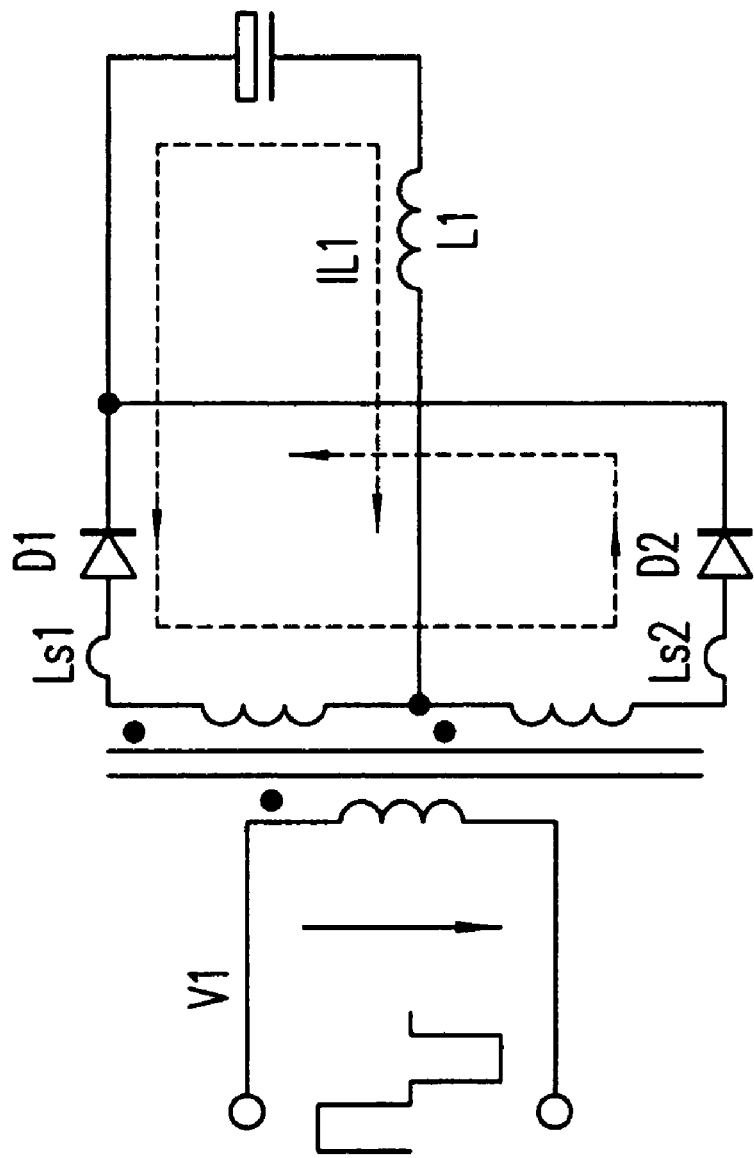
FIG. 5 is the schematic circuit diagram which shows the relative currents of the recovery stage of a typical full-wave rectifier circuit in the prior art.
Figure 6:
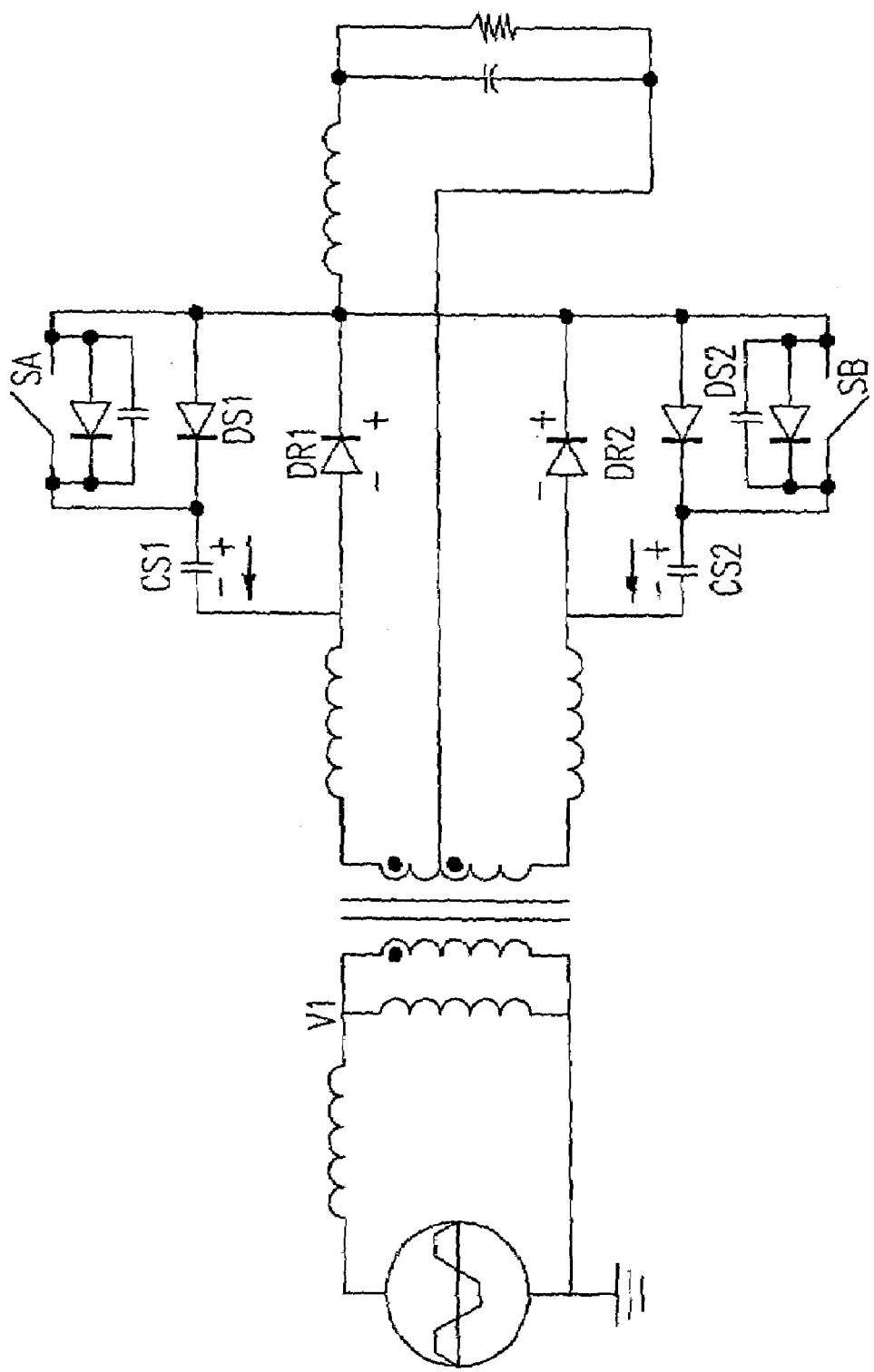
FIG. 6 is the schematic circuit diagram of the first clamping circuit for resolving the reverse recovery problem of the diode in the prior art.
Figure 7:
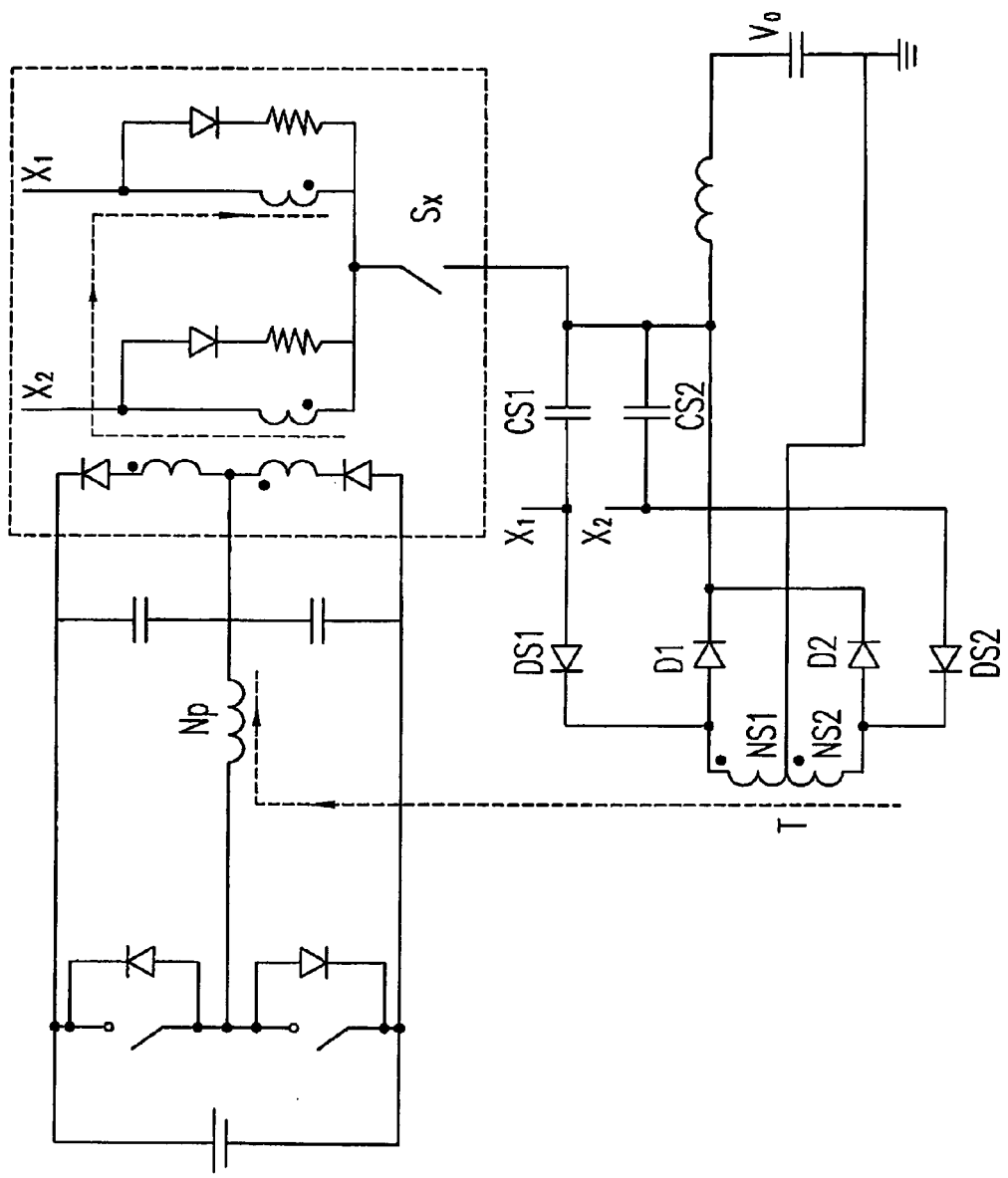
FIG. 7 is the schematic circuit diagram of the second clamping circuit for resolving the reverse recovery problem of the diode in the prior art.
Figure 8:
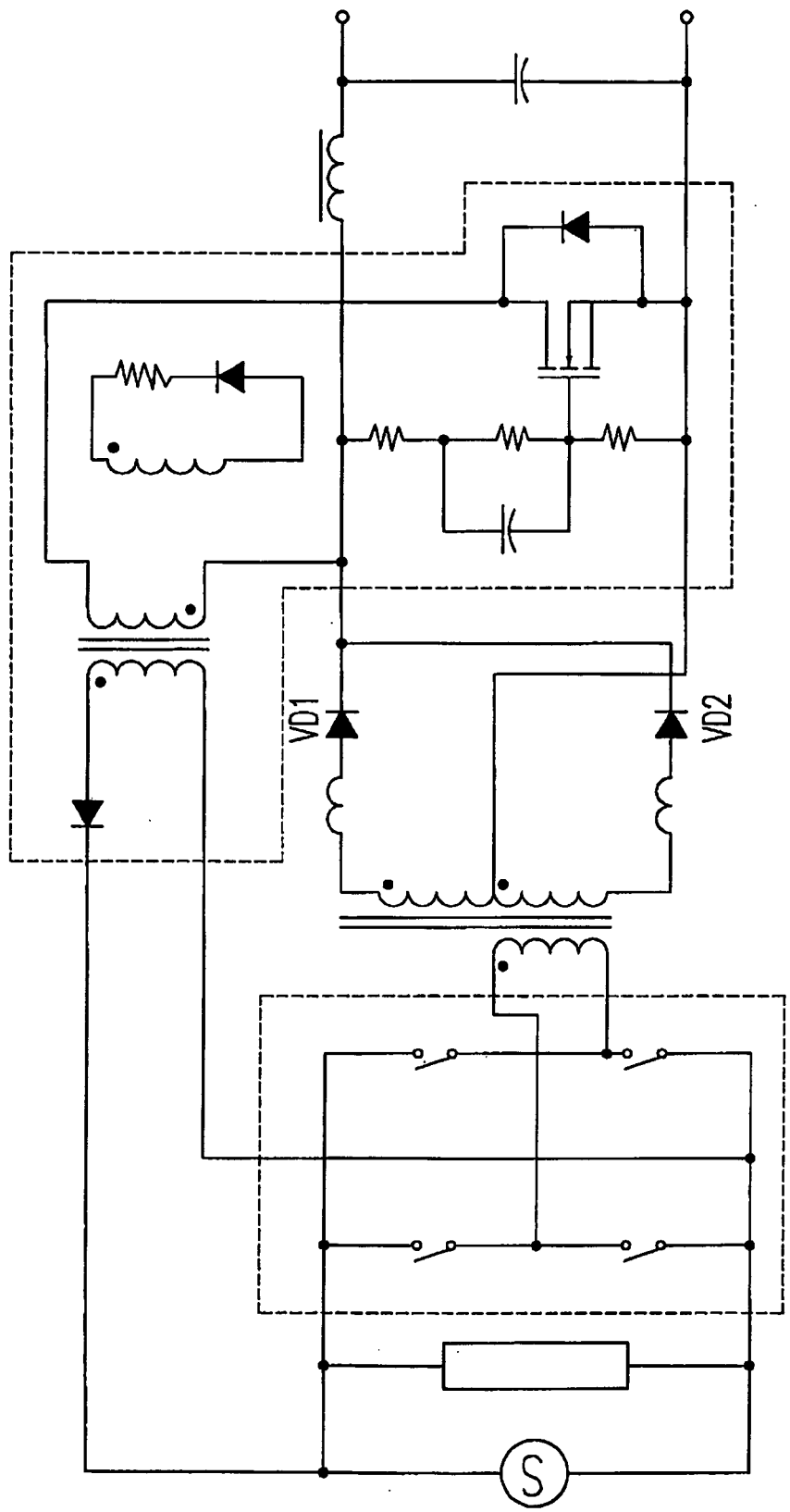
FIG. 8 is the schematic circuit diagram of the third clamping circuit for resolving the reverse recovery problem of the diode in the prior art.

In FIG. 9, the operational procedures are divided into the aforementioned three stages: rectifying stage, continuation stage, and reverse stage. The operational procedures of rectifying and continuation stages of the present invention are similar to those of the full-wave rectifier circuit in the prior art as shown in FIG. 2, but the operational procedures of the recovery stage of the present invention are different from those of the prior art.

Figure 10:
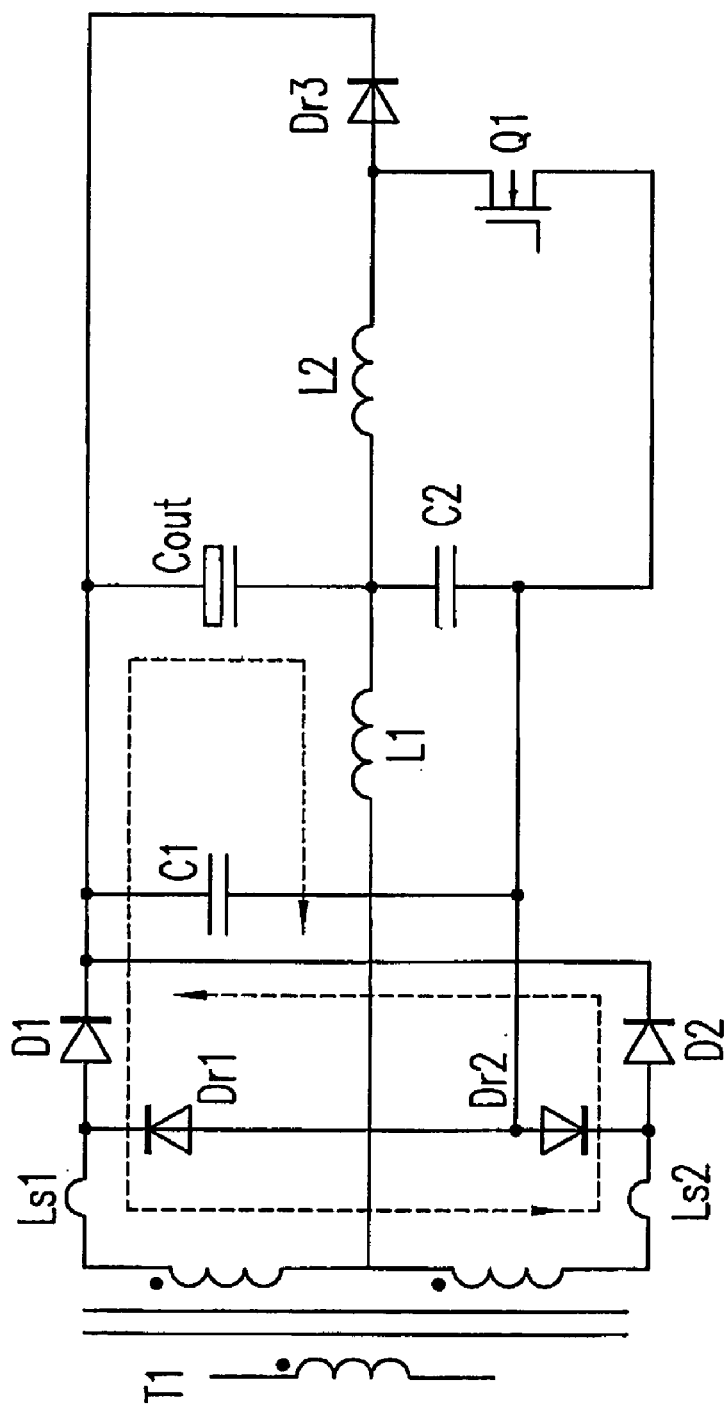
FIGS. 10–11 are the schematic circuit diagrams which respectively show the relative currents and route of the recovery stage of the first preferred embodiment of the present invention having a boost converter to clamp the reverse voltage of the diode.
Figure 11:
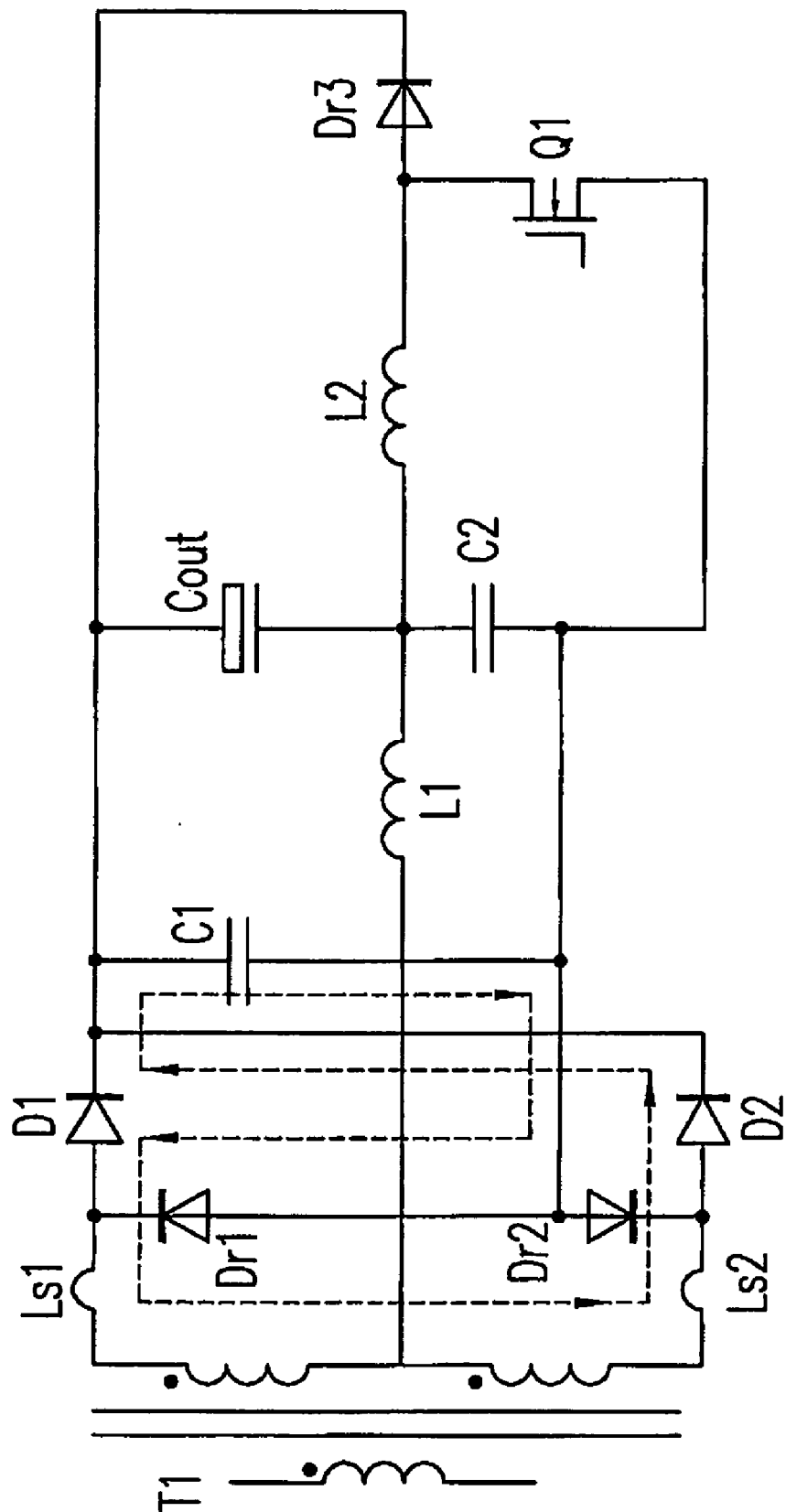

Please refer to FIG. 10. When the reverse recovery begins, the current flowing through the diode $D_2$ is the sum of the currents flowing through the inductors $L_1$ and $L_{s1}$. When the diode $D_1$ has been recovered till the moment t1, the diode $D_1$ begins to have the reverse blocking capability and the diode $D_{r1}$ becomes conductive since the current of the inductors $L_{s1}$ and $L_{s2}$ could not be changed suddenly. The relative route of the recovery stage, $D_{r1}$-$L_{s1}$-$L_{s2}$-$D_2$-$C_1$-$D_{r1}$, is shown in FIG. 11. The electrical energies of the leakage inductances $L_{s1}$ and $L_{s2}$ are stored in the capacitor $C_1$ to avoid the voltage spikes generated on the diode $D_1$.

The electrical energy stored in the capacitor $C_1$ is sent back to the output capacitor $C_{out}$ firstly, and to the load through the boost converter (a circuit including $L_2, D_{r3}, Q_1, C_2$, and $C_{out}$ as shown in FIG. 9) secondly.

Figure 12:
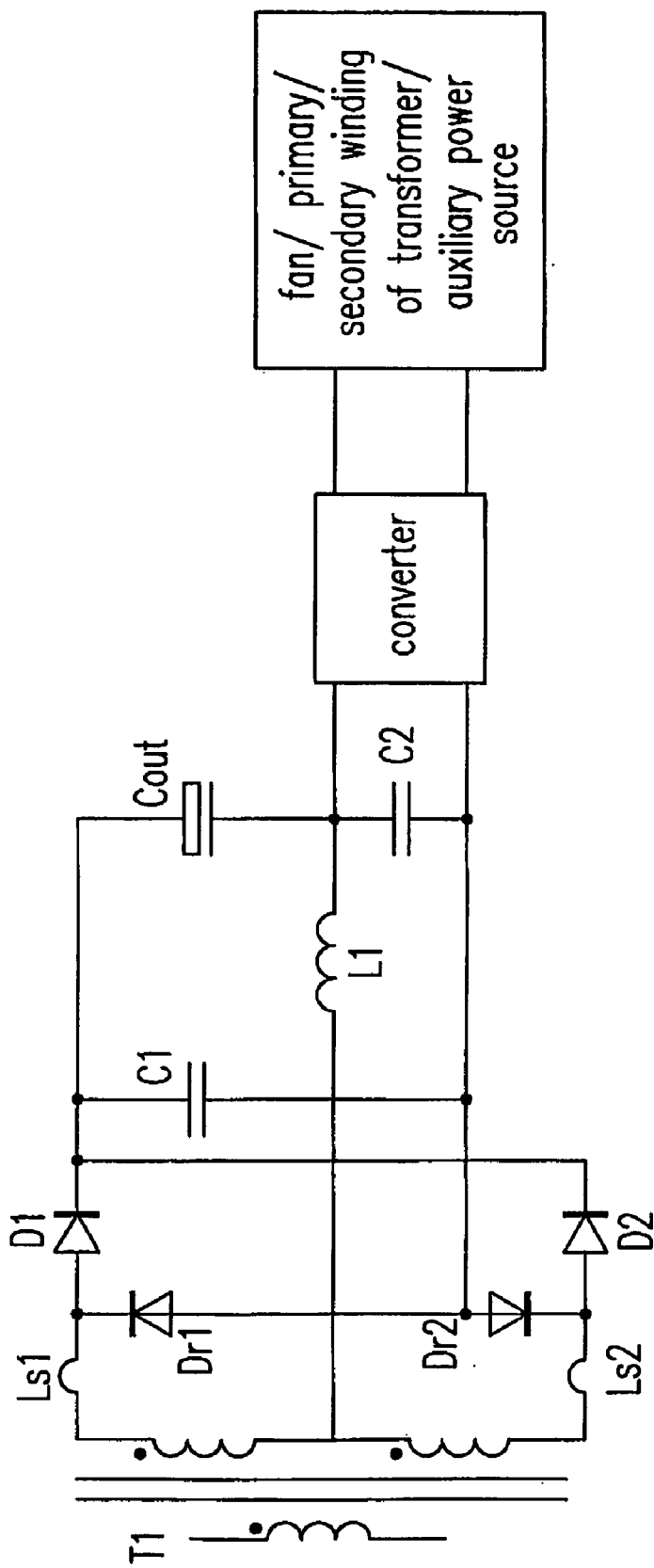
FIG. 12 is the schematic circuit diagram of the second preferred embodiment of the present invention having a converter to clamp the reverse voltage of the diode.

Except for the boost converter, other types of converters can also be employed in the present invention for sending the energies stored in the capacitors to the primary/secondary sides of the transformer, or to be utilized by the fan, or by the auxiliary power source. The schematic circuit diagram of the second preferred embodiment of the present invention is shown in FIG. 12.

Figure 13:
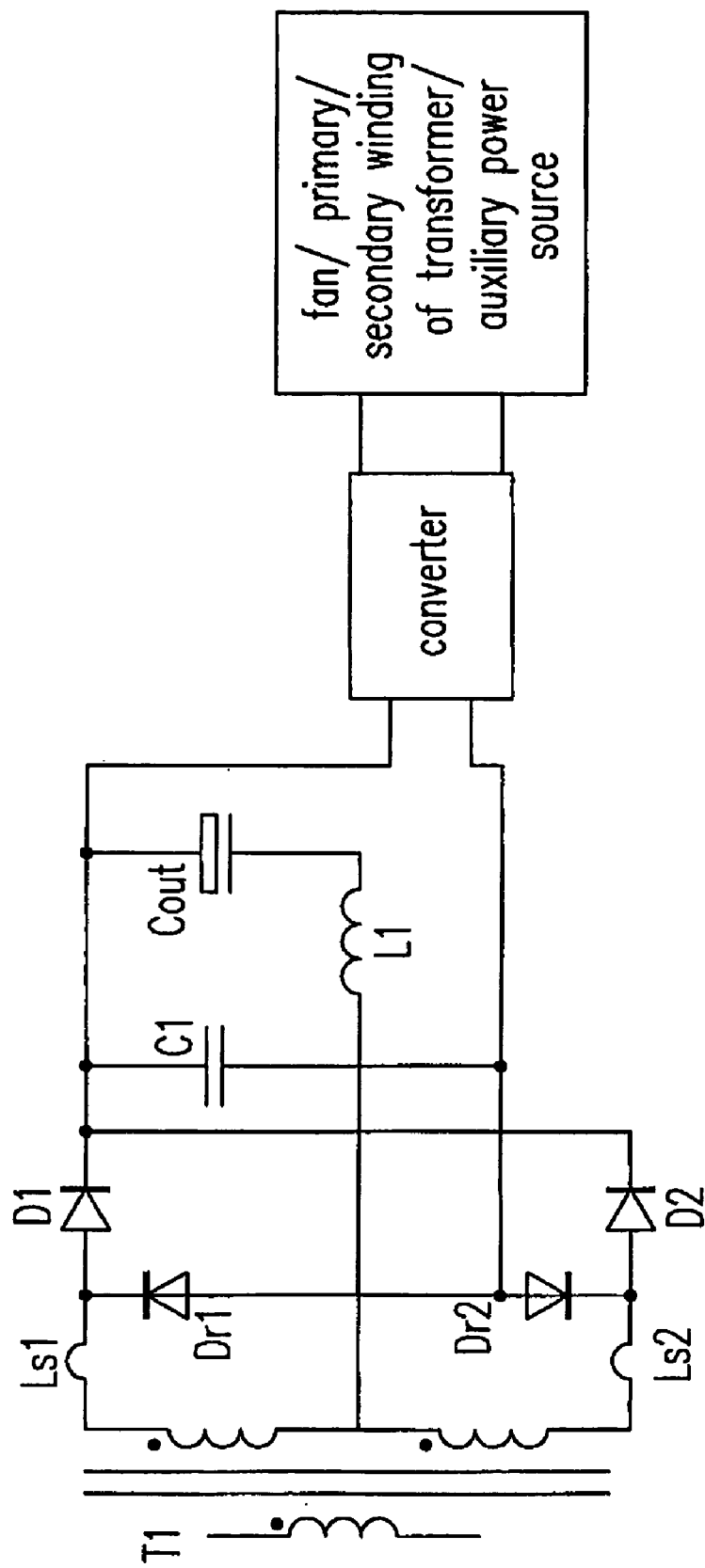
FIG. 13 is the schematic circuit diagram of the third preferred embodiment of the present invention having a converter to clamp the reverse voltage of the diode.

Besides, the capacitor $C_2$ in the proposed circuit can be omitted, and the energies stored in the capacitor $C_1$ can be sent to the primary/secondary sides of the transformer, or to be utilized by the fan, or by the auxiliary power source through a converter. The schematic circuit diagram of the third preferred embodiment of the present invention is shown in FIG. 13.

Figure 14:
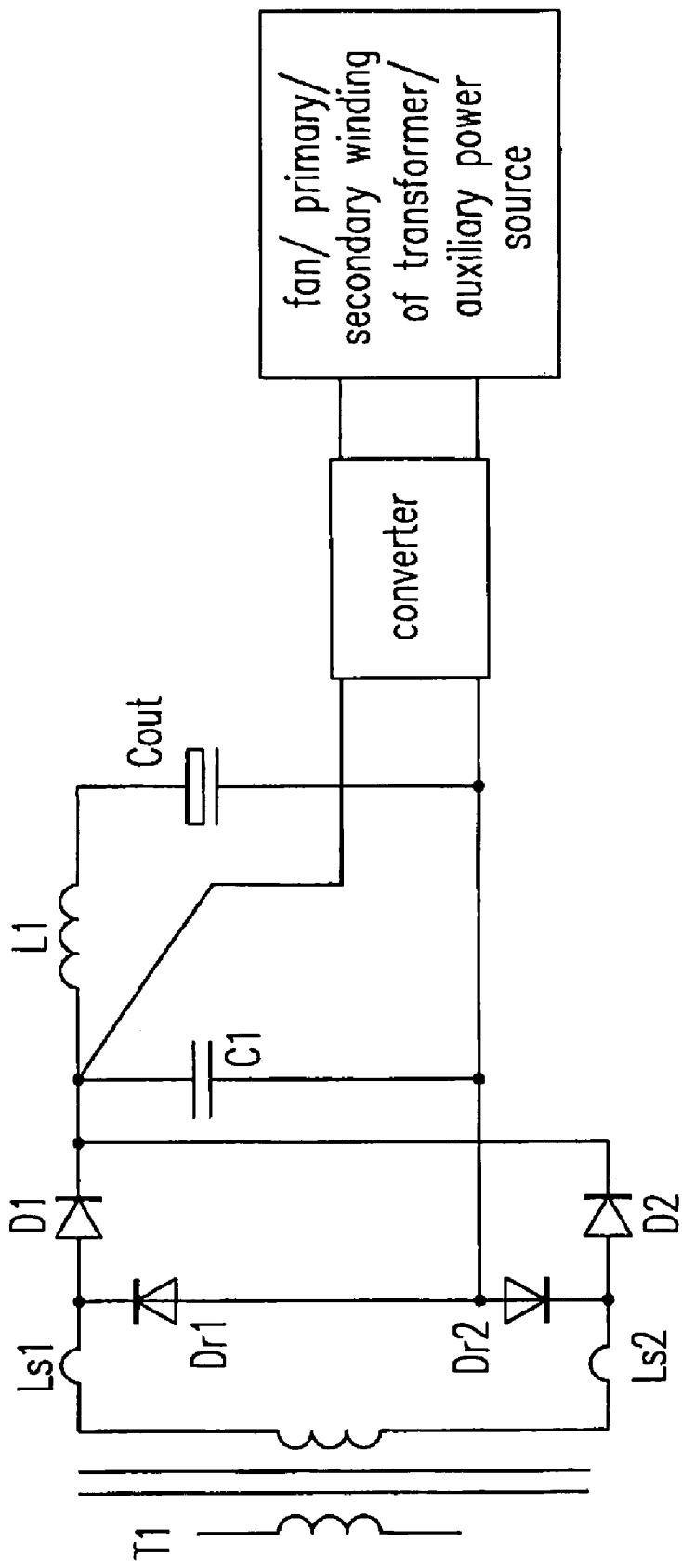
FIG. 14 is the schematic circuit diagram of the fourth preferred embodiment of the present invention having a converter to clamp the reverse voltage of the full-bridge rectifier circuit.

Furthermore, there are the reverse recovery problems in the full-bridge rectifier circuits too, and the principles of the present invention can also be applied to. The schematic circuit diagram of the fourth preferred embodiment of the present invention is shown in FIG. 14.

Figure 15:
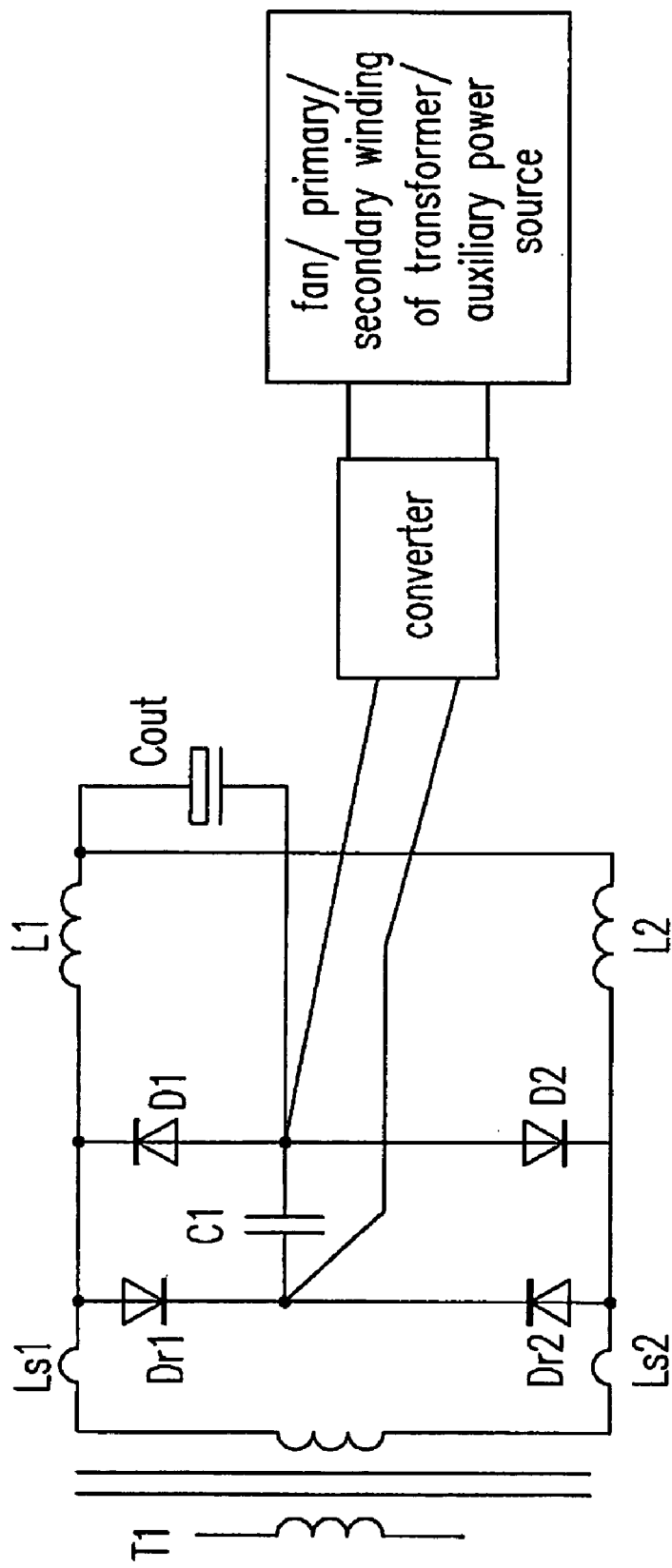
FIGS. 15–16 are the schematic circuit diagrams of the fifth preferred embodiment of the present invention having a converter to clamp the reverse voltage of the double-current circuit respectively.
Figure 16:
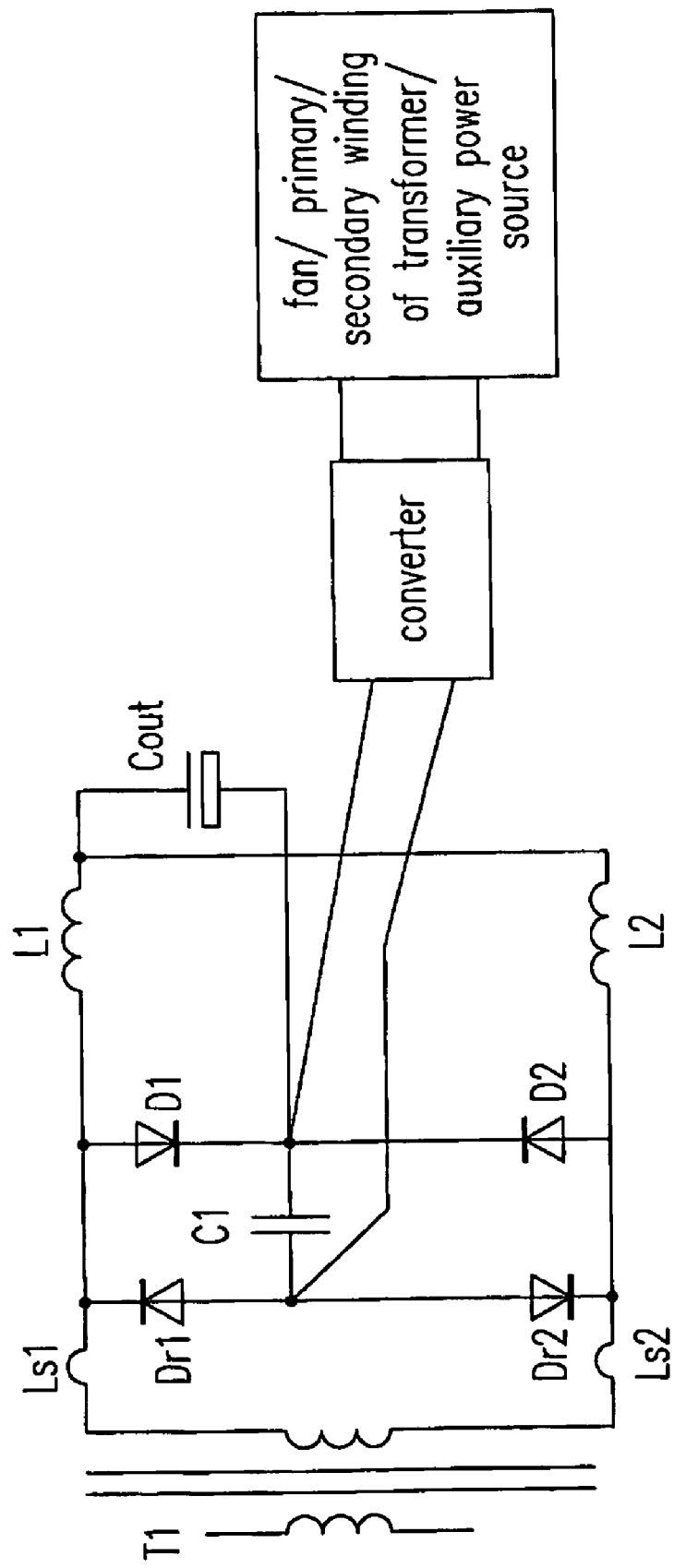

Likewise, there are the reverse recovery problems in the double-current rectifier circuits too, and the principles of the present invention can be applied to also. Two schematic circuit diagrams of the fifth preferred embodiment of the present invention are shown in FIGS. 15–16 respectively.

By the same token, the principles of the present invention can be applied to the synchronous rectifier circuits. Lastly, there are the reverse recovery problems regarding the power MOSFET switches too, and the principles of the present invention can be applied to also. Except for the diodes D1 and D2 are replaced by power MOSFET switches, the preferred embodiments of the present invention applicable to the MOSFET power switches are circuits similar to those of FIGS. 12–16.

In conclusion, the lossless clamping circuits for clamping a reverse voltage over the two terminals of the power elements of the power converter are proposed in the present invention, in which, the clamping energy can be totally reutilized so as to achieve a relatively higher efficiency of the power converter.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A lossless clamping circuit for clamping a reverse voltage over two terminals of a power element of a power converter, wherein said power converter comprises a transformer having a secondary winding electrically connected to a full-wave rectifier circuit, and said full-wave rectifier circuit comprises a first rectifying diode, a second rectifying diode, an output filtering inductor, and an output filtering capacitor, comprising:

two clamping diodes having two anodes electrically connected to each other to form a common-anode terminal and two cathodes electrically connected to two terminals of said secondary winding of said transformer;

a first clamping capacitor having a first terminal electrically connected to a cathode of said first rectifying diode and a second terminal electrically connected to said common-anode terminal;

a second clamping capacitor having a first terminal electrically connected to a connecting node of said output filtering inductor and said output filtering capacitor, and a second terminal electrically connected to said common-anode terminal; and a converter circuit having an input terminal electrically connected to said second clamping capacitor and an output terminal for offering a power sources comprising:

an energy feedback inductor;

an energy feedback switch; and an energy feedback diode.

2. The circuit according to claim 1, wherein said power source is employed to feedback an electrical energy to one of a primary winding and said secondary winding of said transformer.

3. The circuit according to claim 1, wherein said power source is employed as an auxiliary power source.

4. The circuit according to claim 1, wherein said converter circuit is a boost circuit.

5. The circuit according to claim 1, wherein said energy feedback inductor has a first terminal electrically connected to said connecting node, said energy feedback switch has a first terminal electrically connected to a second terminal of said energy feedback inductor and a second terminal electrically connected to said common-anode terminal, and said energy feedback diode has an anode electrically connected to said second terminal of said energy feedback inductor and a cathode electrically connected to a cathode of said first rectifying diode.

6. A lossless clamping circuit for clamping a reverse voltage over two terminals of a power element of a power converter, wherein said power converter comprises a transformer having a secondary winding electrically connected to a full-wave rectifier circuit, and said full-wave rectifier circuit comprises a first rectifying diode, a second rectifying diode, an output filtering inductor, and an output filtering capacitor, comprising:

two clamping diodes having two anodes electrically connected to each other to form a common-anode terminal and two cathodes electrically connected to two terminals of said secondary winding of said transformer;

a clamping capacitor having a first terminal electrically connected to a cathode of said first rectifying diode and a second terminal electrically connected to said common-anode terminal; and a converter circuit having an input terminal electrically connected to said clamping capacitor and an output terminal for offering a power source, comprising:

an energy feedback inductor;

an energy feedback switch; and an energy feedback diode.

7. The circuit according to claim 6, wherein said power source is employed to feedback an electrical energy to one of a primary winding and said secondary winding of said transformer.

8. The circuit according to claim 6, wherein said power source is employed as an auxiliary power source.

9. A lossless clamping circuit for clamping a reverse voltage over a full-bridge rectifier circuit of a power converter, wherein said power converter comprises a transformer having a secondary winding electrically connected to said full-bridge rectifier circuit, comprising:

a clamping capacitor electrically connected to an output terminal of said full-bridge rectifier circuit; and a converter circuit having an input terminal electrically connected to said clamping capacitor and an output terminal for offering a power source, comprising:

an energy feedback inductor;

an energy feedback switch; and an energy feedback diode.

10. The circuit according to claim 9, wherein said power source is employed to feedback an electrical energy to one of a primary winding and said secondary winding of said transformer.

11. The circuit according to claim 9, wherein said power source is employed as an auxiliary power source.

12. A lossless clamping circuit for clamping a reverse voltage over two terminals of a power element of a double current circuit of a power converter, wherein said power converter comprises a transformer having a secondary winding electrically connected to a full-wave rectifier circuit, and said double current circuit comprises a first double current diode and a second double current diode, comprising:

two clamping diodes having two anodes electrically connected to each other to form a common-anode terminal and two cathodes electrically connected to two terminals of said secondary winding of said transformer;

a clamping capacitor having a first terminal electrically connected to a connecting node of said first double current diode and said second double current diode, and a second terminal electrically connected to said common-anode terminal; and a converter circuit having an input terminal electrically connected to said clamping capacitor and an output terminal for offering a power source, comprising:

an energy feedback inductor;

an energy feedback switch; and an energy feedback diode.

13. The circuit according to claim 12, wherein said power source is employed to feedback an electrical energy to one of a primary winding and said secondary winding of said transformer.

14. The circuit according to claim 12, wherein said power source is employed as an auxiliary power source.

15. A lossless clamping circuit for clamping a reverse voltage over two terminals of a power element of a double current circuit of a power converter, wherein said power converter comprises a transformer having a secondary winding electrically connected to a full-wave rectifier circuit, and said double current circuit comprises a first double current diode and a second double current diode, comprising:

two clamping diodes having two cathodes electrically connected to each other to form a common-cathode terminal and two anodes electrically connected to two terminals of said secondary winding of said transformer;

a clamping capacitor having a first terminal electrically connected to a connecting node of said first double current diode and said second double current diode, and a second terminal electrically connected to said common-cathode terminal; and a converter circuit having an input terminal electrically connected to said clamping capacitor and an output terminal for offering a power source, comprising:

an energy feedback inductor;

an energy feedback switch; and an energy feedback diode.

16. The circuit according to claim 6, wherein a first terminal of said output filtering capacitor connected to said cathode of said first rectifying diode; said energy feedback inductor has a first terminal electrically connected to a second terminal of said output filtering capacitor, said energy feedback switch has a first terminal electrically connected to a second terminal of said energy feedback inductor and a second terminal electrically connected to said common-anode terminal, and said diode has an anode electrically connected to said second terminal of said energy feedback inductor and a cathode electrically connected to said first terminal of said output filtering capacitor.

* * * * *